(12) United States Patent
Vincent et al.

(10) Patent No.: US 10,389,706 B2
(45) Date of Patent: Aug. 20, 2019

(54) AUTHENTICATION BASED ON TELEPHONE NUMBER RECYCLING

(71) Applicant: Microsoft Technology Licensing, LLC, Redmond, WA (US)

(72) Inventors: Benjamin Richard Vincent, Kirkland, WA (US); Li Qing Xia, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 315 days.

(21) Appl. No.: 15/225,608

(22) Filed: Aug. 1, 2016

(65) Prior Publication Data

US 2018/0034798 A1     Feb. 1, 2018

(51) Int. Cl.
*G06F 7/04*        (2006.01)
*H04L 29/06*    (2006.01)
(Continued)

(52) U.S. Cl.
CPC .......... *H04L 63/083* (2013.01); *G06F 21/313* (2013.01); *H04L 63/0853* (2013.01);
(Continued)

(58) Field of Classification Search
CPC .......... G06F 2221/2103; G06F 21/313; H04L 63/083; H04L 63/0853; H04L 63/0876; H04L 63/18
(Continued)

(56) References Cited

U.S. PATENT DOCUMENTS

| 8,312,514 | B2 | 11/2012 | Anderson |
| 8,627,438 | B1 * | 1/2014 | Bhimanaik ............ H04L 63/10 726/9 |

(Continued)

FOREIGN PATENT DOCUMENTS

| EP | 1383266 A1 | 1/2004 |
| IN | 02770MU2011 | 5/2014 |

(Continued)

OTHER PUBLICATIONS

"International Search Report and Written Opinion Issued in PCT Application No. PCT/US2017/044055", dated Oct. 26, 2017, 13 Pages.

(Continued)

*Primary Examiner* — Gary S Gracia
(74) *Attorney, Agent, or Firm* — Mannava & Kang, P.C.

(57) ABSTRACT

A method and system for authenticating a user is provided. In some embodiments, a security system determines whether the time since the last authentication was successful is less than a recycle telephone number period (e.g., the minimum time before which a telephone number might be assigned to a new user). If the time is less than the recycle telephone number period, the security system performs a primary authentication of the user based on a telephone number received from the user. When the primary authentication is successful, the security system indicates that the user has been authenticated. When the time is not less than a recycle telephone number period, the security system performs a secondary authentication of the user. When the secondary authentication is successful, the security system indicates that the user has been authenticated.

18 Claims, 8 Drawing Sheets

(51) Int. Cl.
*H04W 4/14* (2009.01)
*G06F 21/31* (2013.01)
*H04W 12/06* (2009.01)
*G06F 15/16* (2006.01)
*H04W 12/00* (2009.01)

(52) U.S. Cl.
CPC .......... *H04L 63/0876* (2013.01); *H04L 63/18* (2013.01); *H04W 4/14* (2013.01); *H04W 12/06* (2013.01); *G06F 2221/2103* (2013.01); *H04W 12/00512* (2019.01)

(58) Field of Classification Search
USPC ...... 455/411, 417; 707/E17.005, 783; 726/3, 726/4, 7, 34
See application file for complete search history.

(56) References Cited

U.S. PATENT DOCUMENTS

| | | | |
|---|---|---|---|
| 9,165,291 B1 | 10/2015 | Andersen et al. | |
| 2005/0008133 A1* | 1/2005 | Liu | H04M 3/382 379/114.14 |
| 2010/0130172 A1* | 5/2010 | Vendrow | G06Q 20/32 455/411 |
| 2011/0016320 A1* | 1/2011 | Bergsten | H04L 63/08 713/170 |
| 2011/0184987 A1 | 7/2011 | Bishop | |
| 2012/0122497 A1* | 5/2012 | Huang | H04L 63/123 455/466 |
| 2013/0090088 A1* | 4/2013 | Chevsky | H04L 63/0876 455/411 |
| 2013/0344855 A1 | 12/2013 | Li et al. | |
| 2014/0192969 A1* | 7/2014 | Brown | H04M 3/54 379/213.01 |
| 2016/0014603 A1* | 1/2016 | Woodward | H04W 12/06 455/411 |
| 2016/0142909 A1 | 5/2016 | Allen et al. | |

FOREIGN PATENT DOCUMENTS

| | | |
|---|---|---|
| KR | 20110017165 A | 8/2009 |
| WO | 2008073606 A2 | 6/2008 |
| WO | 2013028901 A2 | 2/2013 |

OTHER PUBLICATIONS

Saelensminde et al., "A Simple Password Less Authentication System for Web Sites," In Proceedings of Seventh International Conference on Information Technology: New Generations, Apr. 12, 2010, pp. 132-137.

Zhu et al., "Loxin—A solution to password-less universal login," In Proceedings of IEEE INFOCOM Workshop on Security and Privacy in Big Data, Apr. 27, 2014, pp. 488-493.

* cited by examiner

AUTHENTICATION BASED ON TELEPHONE NUMBER RECYCLING

BACKGROUND

Authentication of users has traditionally been performed based on use of a user name and a password as security credentials. For example, when a user attempts to their account of an account provider (e.g., bank account of a bank), the user (i.e., the account holder) provides the user name and password for their account. The user name is the account identifier of their account, and the password is a shared secret (i.e., shared by the user and the account provider) that is used to verify that the user is authorized to access the account. If the user name matches that of an account of the account provider and the password matches that of the account, then the user is authenticated and allowed access to the account.

The use of a user name and a password for authentication has proved to be less than secure primarily because user names and passwords are susceptible to theft. As one example, a large social network was once hacked and millions of user names and passwords were stolen. As another example, malware that infects computers can install a keystroke logger, which can capture and record user names and passwords as users enter them to log on to their accounts. Of course, once a user name and a password of an account are stolen, the thief can use them to access the user's account.

Once a theft occurs, the thief can often access many accounts of the user because users often use the same user name and password for different accounts. Users use the same user name and passwords, in part, because of the difficulty of remembering different user names and passwords. To further increase security, some account providers have increased the required minimum complexity of passwords. For example, passwords may be required to be at least eight characters long and include a capital letter, a number, and a special character. As the complexity of passwords increases, the difficulty of remembering the passwords also increases. As a result, users are even more inclined to use the same user name and password for different accounts.

To help prevent theft of passwords, some account providers store a hash of a password, rather than storing the password itself. Such account providers may use a one-way hash function that inputs a password and outputs its hash. To authenticate a user, the user provides their password, and the account provider generates the hash of the password. The account provider compares the generated hash to the stored hash, and if they are the same, the user is authenticated. The account provider can then discard the password—so that it cannot be stolen from the account provider. Even if the passwords cannot be stolen from the account providers, passwords are still susceptible to be stolen via a keystroke logger or by malware that searches for files that contain passwords of a user (e.g., a file named "passwords.txt").

To enhance security, some account providers use multi-factor authentication techniques. For example, when a user enters their user name and password, the account provider may send to the user's telephone a text message with an authentication code and prompt the user to enter the authentication code. Once the user enters the correct authentication code, the user is authenticated. As another example, a user may be provided a token (e.g., a specialized hardware device or a program) that generates codes based on time of day that are synchronized with codes generated by the account provider for that user. To access their account, the user provides their current code along with their user name and password. If the code matches that expected for the account, the user is authenticated. Although multi-factor authentication is much more secure than just single-factor authentication (e.g., user name and password), users still need to remember their complex passwords, which are ideally different for each account.

SUMMARY

A method and system for authenticating a user is provided. In some embodiments, a security system determines whether a recycle account identifier criterion is satisfied (e.g., the minimum time before which an account identifier might be assigned to a new user). If the recycle account identifier criterion is satisfied, the security system performs a secondary authentication. Otherwise, the security system performs a primary authentication. The security system then indicates that the user has been authenticated when an authentication that is performed is successful.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
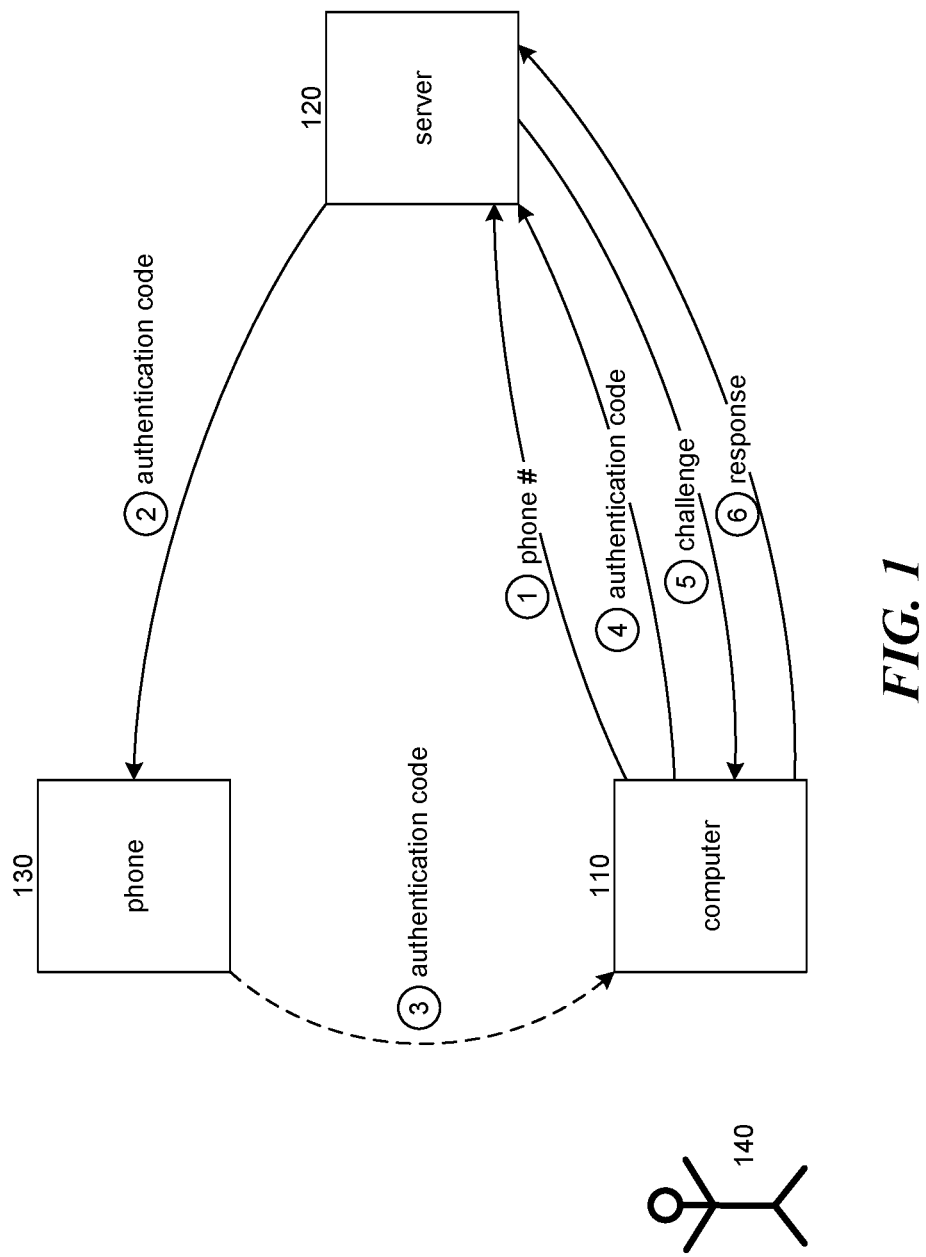
FIG. 1 is a data flow diagram illustrating authentication by a CAI security system in some embodiments.

In an effort to help ensure that unauthorized users cannot gain access to an account, while avoiding the need for users to remember complex passwords, some account providers may use a user's telephone number as their account identifier. To access their account, a user enters their telephone number, for example, at a login page of the account provider. The account provider determines whether that telephone number is the account identifier of an account. If so, the account provider sends an authentication code (e.g., via an SMS message or voice call) to the telephone number. When the user receives the authentication code, the user enters the authentication code at the login page. The account provider then determines whether the entered authentication code matches the sent authentication code. If so, the account provider has authenticated the user and allows the user to access their account. Some account providers may use a user's electronic mail address as their account identifier. If so, the user would enter their electronic mail address as their account identifier, receive an electronic mail message with an authentication code, and enter the authentication code to access their account. Such authentication using an account identifier of a communications account (e.g., SMS account or electronic mail account) is referred to as communications account identifier ("CAI") authentication.

The use of CAI authentication simplifies the authentication process and helps ensure that unauthorized users do not access an account. Unfortunately, the CAIs are susceptible to being recycled—that is, unassigned from one user and reassigned to another user. For example, if a user's communications account is a landline account with a CAI that is a telephone number, then when the user moves, that telephone number may be assigned to a different user. As another example, in some regions, cellular numbers are allocated to cellular carriers who are local assignors of cellular numbers. In such a case, when a user switches cellular carriers, a new user may be assigned the user's old cellular number, and the user is assigned a new cellular number of the new cellular carrier, which may itself be an old number of a former user of the new cellular carrier. As another example, if a user closes an electronic mail account for their electronic mail address (e.g., user1@outlook.com), another user may then open an electronic mail account using the same electronic mail address. The assigning of a CAI that was previously used by one user to another user is referred to as recycling the CAI, and such a CAI is referred to as a recyclable CAI.

The use of recyclable CAIs for CAI authentication presents a security vulnerability when the CAI is recycled, which is referred to as a recyclable CAI vulnerability. When an account is established with an account provider that uses CAI authentication, the user provides their CAI for their communications account as the account identifier for the newly established account. For example, the user may use their cellphone number as their account identifier for a newly established account of a social network. If the user then gives up their communications account, that user's CAI may then be assigned to a new user. For example, when the user switches cellular carriers, the user's cellphone number may be assigned to a new user. The new user may then use their newly assigned CAI to unwittingly access the account of the user. The new user will receive an authentication code via their new communications account and use that authentication code to gain access to the account of the other user. For example, the new user may use their new cellphone number to access what they think is their own account on the same social network. In such a case, the new user will receive the authentication code via their new cellphone number and enter the authentication code to gain access to the account of the other user.

A method and system is provided that employs countermeasures to a recyclable CAI vulnerability to reduce the chance that the vulnerability will be exploited. In some embodiments, a CAI security system conducts a secondary authentication when a primary authentication (e.g., CAI authentication) is susceptible to a recyclable CAI vulnerability. The CAI security system determines that the primary authentication may be susceptible to a recyclable CAI vulnerability when a recycle CAI criterion is satisfied. If the recycle CAI criterion for an account is satisfied when a user attempts to access their account, the CAI security system performs a secondary authentication and may also perform a primary authentication. The secondary authentication relies on information that is independent of the primary authentication, but that is specific to the account holder, to control access to the account. For example, secondary authentication may request the user to identify the maiden name of the account holder's mother. Since the new user who is using a recycled CAI will not have access to the information of the account holder, the CAI security system will not allow the new user to access the account but will allow the account holder to access the account. Once the account holder accesses the account for the CAI that has been recycled, the account holder can change the CAI of their account to their new CAI.

The recycle CAI criterion may be based on the minimum amount of time between the un-assigning of a CAI from one user and assigning to a new user. This minimum amount of time is referred to as the recycle CAI period (e.g., recycle telephone number period). Communications account providers often publish their recycle CAI periods. For example, some telephone carriers may use a recycle CAI period of one month, and others may use a recycle period of six months. The recycle CAI criterion may be based on the time of last authentication for an account and the recycle CAI period. If the length of time since the last authentication is less than the recycle CAI period, then the recyclable CAI vulnerability cannot be exploited. In such a case, the CAI security system need only use the primary authentication to authenticate a user. If, however, the length of time since the last authentication is not less than the recycle CAI period, the account is susceptible to the recyclable CAI vulnerability. In such a case, the CAI security system performs the secondary authentication. A new user who has been assigned the CAI previously assigned to the account holder is very unlikely to know or have access to information needed for the secondary authentication, and the new user will be denied access to the account. The account holder, however, will know or have access to the needed information and will be given access to their account and can change their CAI if the account holder is no longer assigned their prior CAI. As such, the CAI security system takes countermeasures to prevent the recyclable CAI vulnerability from being exploited.

In some embodiments, the CAI security system is employed to prevent the recyclable CAI vulnerability of telephone numbers from being exploited. When a user attempts to access an account by providing a telephone number, the CAI security system determines whether the time since a last successful authentication for that account is less than the recycle period for the telephone number. If so, the CAI security system need only perform the primary authentication such as a CAI authentication. If the primary authentication is successful, the user is allowed access to the account. If, however, the time since the last successful authentication is not less than the recycle period, then the CAI security system performs a secondary authentication based on information that is unlikely to be available to a new user who has been assigned the telephone number previously assigned to the account holder. If the secondary authentication is successful, then the user may be allowed access to the account. In some embodiments, the CAI security system may always require a successful primary authentication to allow access to the account. If so, when the time since the last successful authentication is not less than the recycle period, the user is allowed access to the account only when both the primary authentication and secondary authentication are successful.

In some embodiments, the CAI security system may provide a separate technique for allowing an account holder to change the CAI of their account after the current CAI has been unassigned from them. If the current CAI has been unassigned from the account holder, then the primary authentication cannot be successful since the account holder no longer has access to the communications account (e.g., cellphone with the telephone number of the current CAI). The separate technique may be, for example, a web page through which the account holder provides the current CAI of the account (or some other identifier of the account) and requests to change the CAI because the account holder is no longer assigned to the current CAI. In such a case, the CAI security system may perform an authentication that is similar to a secondary authentication. If the user is authenticated, then the CAI security system allows the user to change the CAI of their account to a new CAI and may perform a primary authentication to confirm that the user is assigned to the communications account with the new CAI.

In some embodiments, the secondary authentication can be an active or a passive authentication. An active authentication requires a user to actively provide information that is likely to be not known by a new user who has been assigned the recycled telephone number of the user. Such actively provided information may include completion of an obscured electronic mail address of the account holder and entry of an authentication code sent to that electronic mail address, the name of the first school of the account holder, the name and birth date of the account holder, the account holder's mother's maiden name, the name of the account holder's first pet, a biometric characteristic (e.g., fingerprint), and so on. A passive authentication does not require a user to actively provide information but rather passively collects information about the user. If the passively collected information is similar to the previously collected information for the account holder, then the secondary authentication is successful. For example, the passively collected information may include the current location of the user's device (e.g., desktop computer) as determined by a global positioning system or IP address geolocation system. If the current location is very close to a previous location of the account holder's device, then the secondary authentication may be considered to be successful because the user newly assigned to the telephone number is unlikely to be at such a previous location. As another example, the passively collected information may include information collected from the user's device such as a device identifier, operating system and version, installed application programs and versions, names of files, data of application programs, and so on. The data of the application program may include names in an address book, user names for accounts as stored by a browser, cookies used by a browser, and so on. A user newly assigned to the telephone number is unlikely to have similar information stored on their computer. The passively collected information may also include behavioral biometrics of a user such as typing speed.

In some embodiments, when performing a secondary authentication, the CAI security system may first employ a passive authentication. If the passive authentication is successful, then the secondary authentication is considered successful. If, however, the passive authentication is not successful, the CAI security system then employs an active authentication. In such a case, the secondary authentication is considered successful if the active authentication is successful even though the passive authentication was not successful. In this way, the account holder is burdened with a secondary authentication only when the passive authentication is not successful. The CAI security system may passively collect several different types of information such as names of application programs and names in an address book. The CAI security system may generate a score for each type of information based on its similarity to information that was previously passively collected and combine the scores to generate an overall or combined score. If the combined score satisfies a threshold score, then the passive authentication is considered successful. The score for each type of information may also be weighted based on the effectiveness of the type of information for authentication purposes. Alternatively, the passively collected information may be represented as a feature vector that is compared to feature vectors of previously collected information using a cosine similarity measure.

FIG. 1 is a data flow diagram illustrating authentication by a CAI security system in some embodiments. A CAI security system executes on a server 120, which may be that of an identity provider that provides authentication for accounts of an account provider. The server interacts with user computer 110 and user telephone 130. To access their account, a user 140 enters the telephone number via the user computer, which sends (1) the telephone number to the server. The server verifies that the telephone number matches an account and sends (2) an authentication code to the telephone number via an SMS message. When the SMS message arrives at the user telephone, the user retrieves (3) the authentication code from the user telephone and enters the authentication code as prompted by the user computer. The user computer sends (4) the authentication code to the server. The server ensures that the authentication code matches the authentication code sent to the user telephone. If so, the primary authentication has been completed. If the time since last authentication is not less than the recycle CAI period for the telephone number, then the server generates a challenge and sends (5) the challenge to the user computer. For example, the challenge may request the user to enter the maiden name of the mother of the account holder. The user then enters the response via the user computer, and the user computer sends (6) the response to the server. If the response is correct, then the server indicates that the user has been authenticated to access the account.

Figure 2:
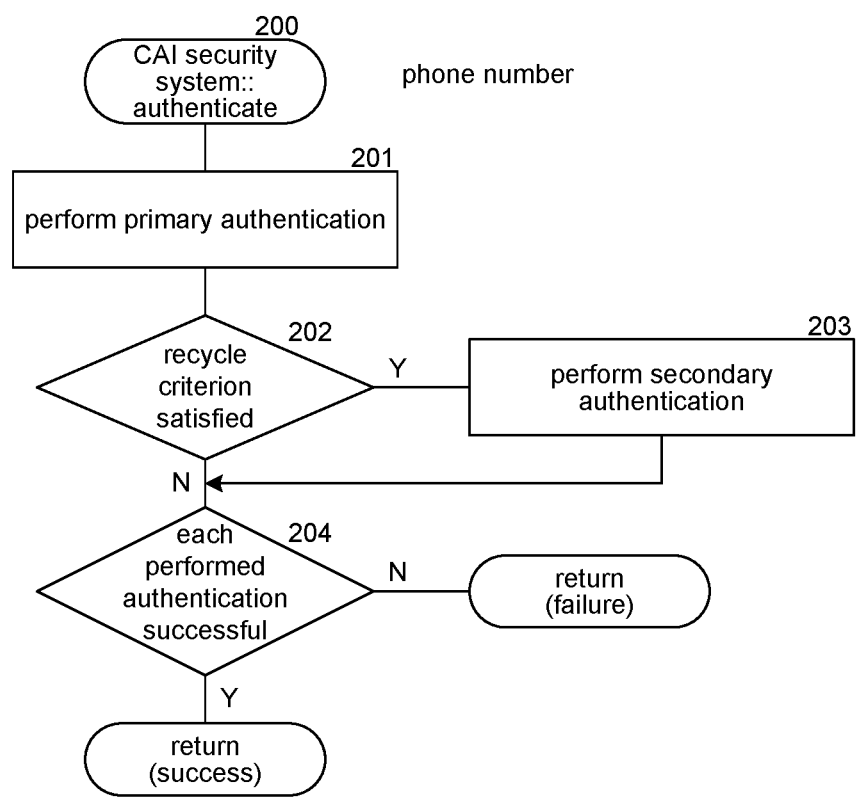
FIG. 2 is a flow diagram that illustrates processing of authentication by a CAI security system in some embodiments.

FIG. 2 is a flow diagram that illustrates processing of authentication by a CAI security system in some embodiments. An authentication component 200 is invoked passing a telephone number that a user has submitted to access an account. In block 201, the component performs a primary authentication such as a CAI authentication. In decision block 202, if the recycle CAI criterion for the telephone number is satisfied, then the component continues at block 203, else the component continues at block 204. In block 203, the component performs a secondary authentication. In decision block 204, if each authentication that has been performed is successful, the component returns an indication of success, else the component returns an indication of the failure. Alternatively, prior to performing the primary authentication, the component may perform the secondary authentication if the recycle CAI criterion is satisfied. If the secondary authentication is successful, the component may give the user the option to change their account identifier to a new CAI. Whether the user changed their account identifier or not, the component may then perform a primary authentication.

Figure 3:
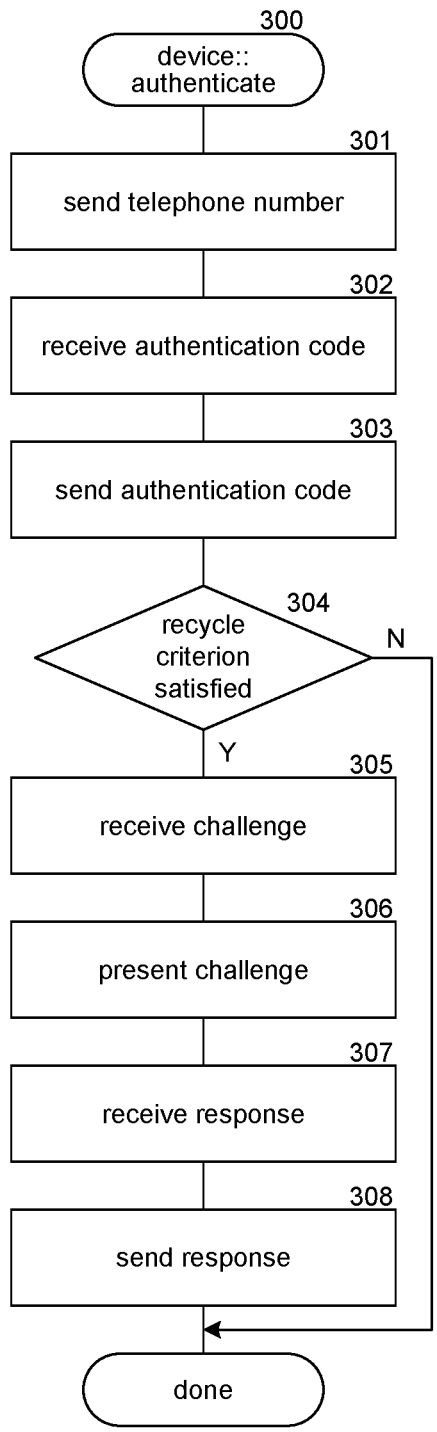
FIG. 3 is a flow diagram that illustrates processing by a user device to support authentication of a user in some embodiments.

FIG. 3 is a flow diagram that illustrates processing by a user device to support authentication of a user in some embodiments. In block 301, a user device 300 receives a telephone number from the user and sends a telephone number to a CAI security system. In block 302, the user device receives from the user an authentication code that was sent from the CAI security system to the telephone number as an SMS message. In block 303, the user device sends the authentication code to the CAI security system. In decision block 304, if the CAI system determines that the recycle criterion is satisfied, then the user device continues at block 305, else the user device completes its authentication processing. In block 305, the user device receives a challenge from the CAI security system. In block 306, the user device presents the challenge to the user. In block 307, the user device receives the response to the challenge from the user. In block 308, the user device sends the response to the CAI security system and then completes.

Figure 4:
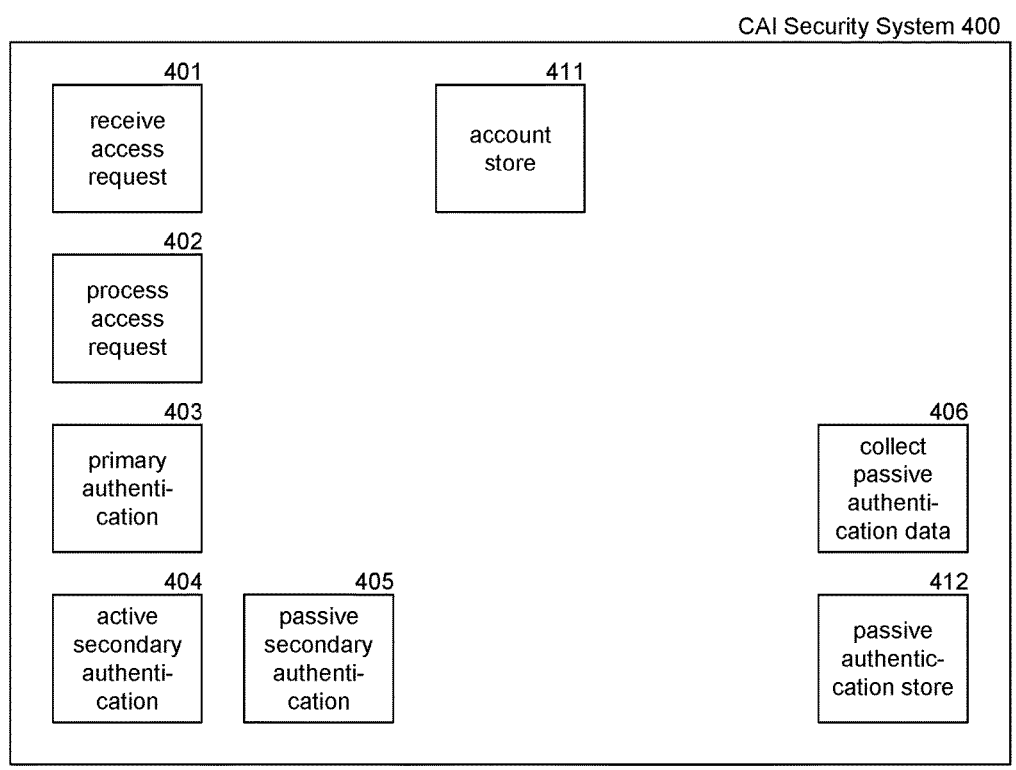
FIG. 4 is a block diagram that illustrates components of the CAI security system in some embodiments.

FIG. 4 is a block diagram that illustrates components of the CAI security system in some embodiments. A CIA security system 400 may include a receive access request component 401, a process access request component 402, a primary authentication component 403, an active secondary authentication component 404, a passive secondary authentication component 405, and a collect passive authentication data component 406. The CAI security system also includes an account store 411 and a passive authentication store 412. The receive access request component receives a telephone number provided by a user to access an account. The process access request component is invoked to authenticate that the user is authorized to access the account. The process access request component invokes the primary authentication component, the active secondary authentication component, and/or the passive secondary authentication component. The primary authentication component performs a CAI authentication. The active secondary authentication component presents a challenge to the user that the user needs to correctly respond to in order to access the account. The passive secondary authentication component collects information passively and determines whether to authenticate the user based on the collected information. The account store stores information for each account such as the telephone number that is the account identifier, the name of the account holder, and challenge and response information for use when performing an active secondary authentication. The collect passive authentication data component is invoked to passively collect information for use in authenticating the user. The passive authentication store stores information that has been previously passively collected and is used to determine whether to authenticate the user based on the information that is currently passively collected. The CAI security system may passively collect information each time a user accesses their account and update the passive authentication store to ensure that the information is up to date when a passive authentication is performed.

The computing systems on which the CAI security system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have data recorded on them or may be encoded with computer-executable instructions or logic that implements the CAI security system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting deployment data using the keys.

The CAI security system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the CAI security system may be implemented in hardware using, for example, an application-specific integrated circuit (ASIC).

Figure 5:
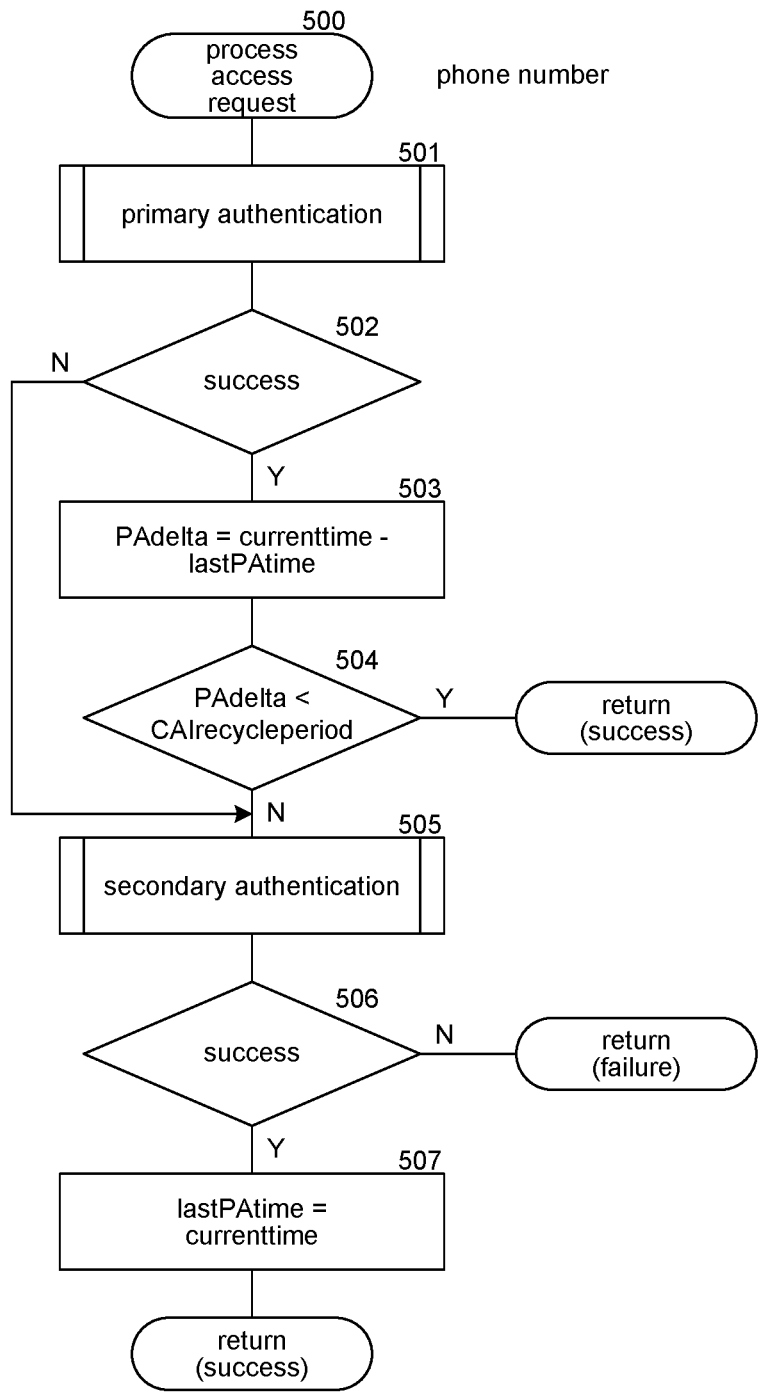
FIG. 5 is a flow diagram that illustrates processing of a process access request component of the CAI security system in some embodiments.

FIG. 5 is a flow diagram that illustrates processing of a process access request component of the CAI security system in some embodiments. A process access request component 500 is invoked to authenticate a user who is requesting access to an account. The component is passed a telephone number entered by the user. In block 501, the component invokes a primary authentication component to perform a primary authentication on the user. In decision block 502, if the primary authentication was successful, then the component continues at block 503, else the component may return an indication of the failure. If the primary authentication was not successful, then the user who entered the telephone number (i.e., the account holder or other user) is not assigned that telephone number. In such a case, the component may continue at block 505 to perform a secondary authentication and, if the secondary authentication is successful, also allow the user to change the telephone number that is the CAI for the account. In block 503, the component calculates the time (PAdelta) since the last successful primary authentication (or any successful authentication). In decision block 504, if the time since the last successful primary authentication is less than the recycle CAI period, then the component returns an indication of success, else the component continues at block 505. In block 505, the component invokes a secondary authentication component to perform a secondary authentication on the user. In decision block 506, if the secondary authentication was successful, then the component continues at block 507, else the component returns an indication of the failure. In block 507, the component sets the time of the last successful primary authentication to the current time and then returns an indication of success.

Figure 6:
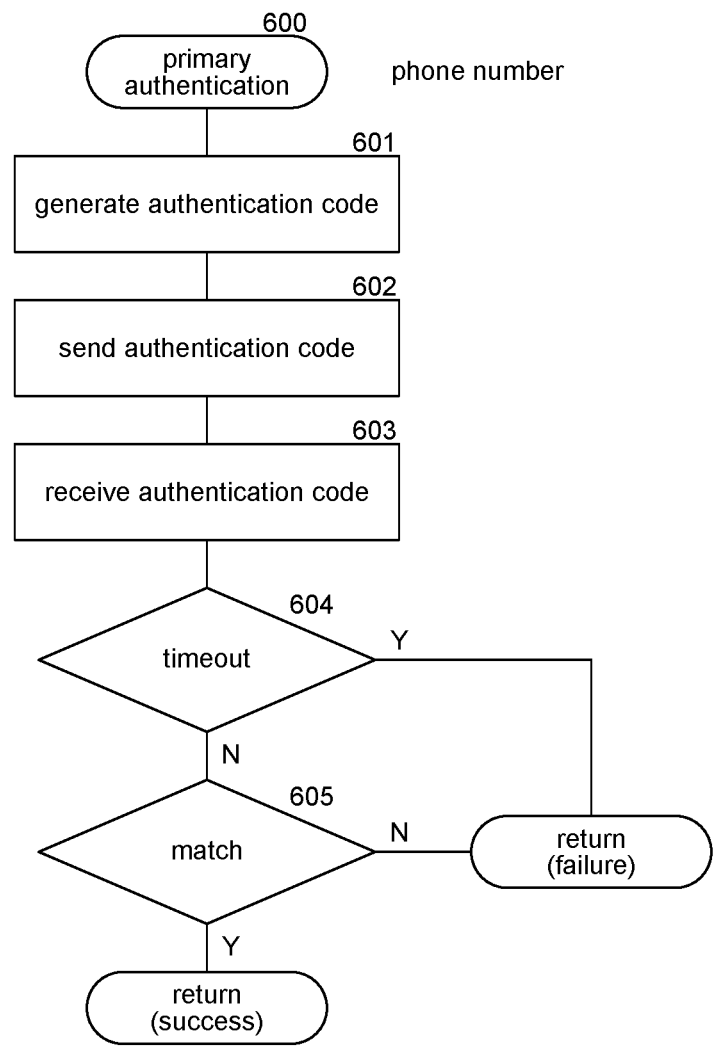
FIG. 6 is a flow diagram that illustrates processing of a primary authentication component of a CAI security system in some embodiments.

FIG. 6 is a flow diagram that illustrates processing of a primary authentication component of a CAI security system in some embodiments. A primary authentication component 600 performs a CAI authentication based on a passed telephone number. In block 601, the component generates an authentication code. For example, the authentication code may be a randomly generated number. In block 602, the component sends the authentication code to the telephone number as an SMS message. In block 603, the component receives the authentication code from the user's computer. In decision block 604, if a timeout period has expired before receiving the authentication code, then the component returns an indication of failure, else the component continues at block 605. In decision block 605, if the received authentication code matches the sent authentication code, then the component returns an indication of success, else the component returns an indication of failure.

Figure 7:
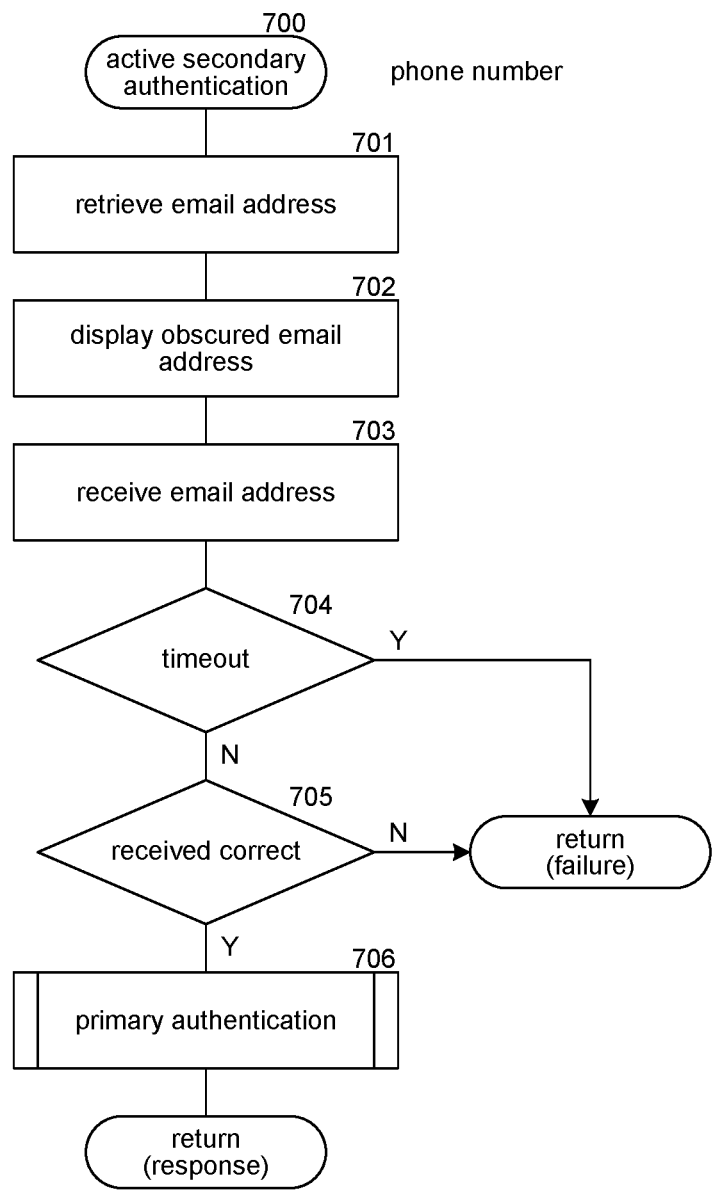
FIG. 7 is a flow diagram that illustrates processing of an active secondary authentication component of a CAI security system in some embodiments.

FIG. 7 is a flow diagram that illustrates processing of an active secondary authentication component of a CAI security system in some embodiments. An active secondary authentication component 700 is passed a telephone number associated with an account and authenticates the user. In block 701, the component retrieves an electronic mail address associated with the account identified by the telephone number. In block 702, the component displays an obscured version of the electronic mail address (e.g., missing letters) to the user. In block 703, the component receives an electronic mail address from the user. In decision block 704, if a timeout occurs before the electronic mail address is received, then the component returns an indication of failure, else the component continues at block 705. In decision block 705, if the received electronic mail address matches the retrieved electronic mail address, then the component continues at block 706, else the component returns an indication of failure. In block 706, the component invokes a primary authentication component passing an indication of the electronic mail address to perform a CAI authentication based on the electronic mail address. The component then returns the response returned by the primary authentication component.

Figure 8:
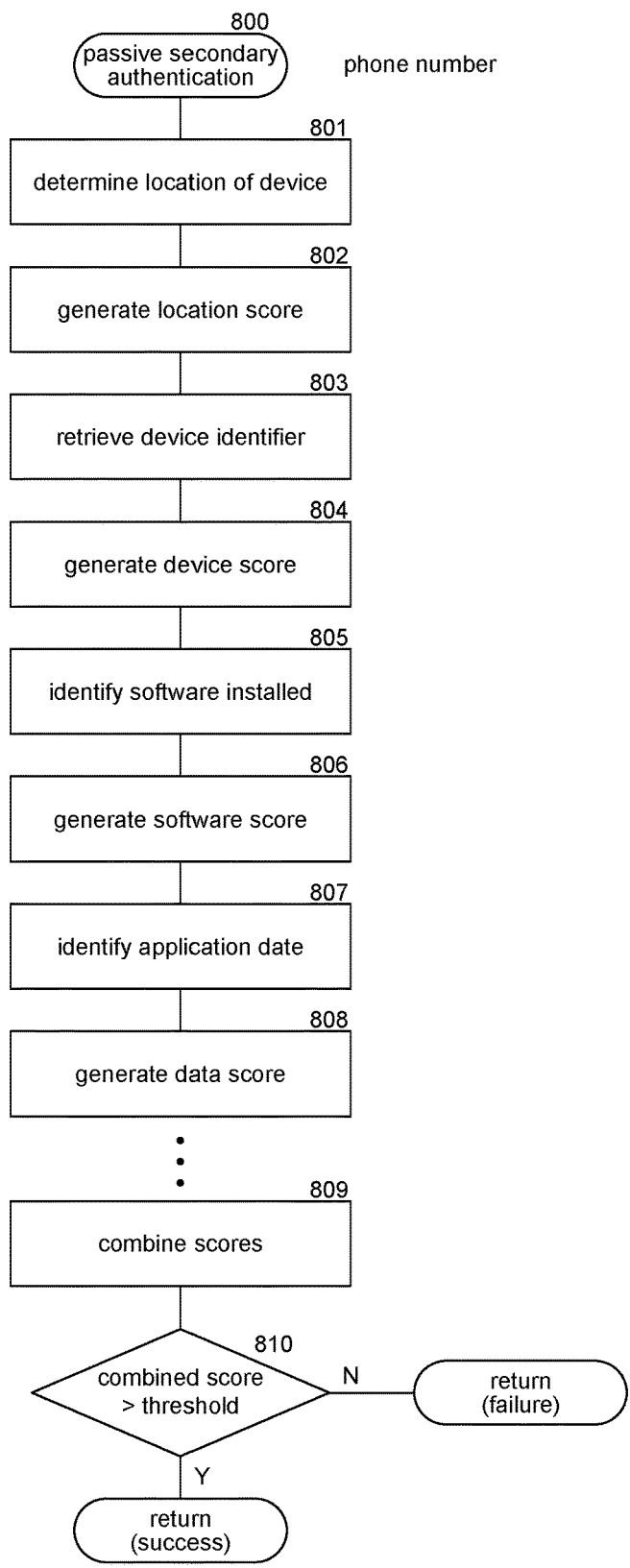
FIG. 8 is a flow diagram that illustrates processing of a passive secondary authentication component of a CAI security system in some embodiments.

FIG. 8 is a flow diagram that illustrates processing of a passive secondary authentication component of a CAI security system in some embodiments. A passive secondary authentication component 800 is invoked passing a telephone number of the account for which a passive authentication is to be performed. In blocks 801-802, the component determines the location of the user device that is communicating with the CAI security system and generates a score based on how closely the location matches a previously known location associated with the account. In blocks 803-804, the component retrieves a device identifier of the user device that is communicating with the CAI security system and generates a score based on whether the device identifier matches a previously known device identifier of the account. In blocks 805-806, the component identifies the software that is installed on the user device that is communicating with the CAI security system and generates a score based on how closely the software matches the software that was previously installed on a user device that accessed the account. In blocks 807-808, the component identifies application data of the computer (e.g., user names stored by a browser) and generates a score based on comparing that application data to application data previously collected from a user device that accessed the account. The ellipsis indicates that additional data for different types or categories of data may be collected and scores generated. In block 809, the component combines the scores into the overall score (e.g., which ranges from 0 to 100). In decision block 810, if the combined score satisfies an authentication threshold (e.g., a score of 90 or greater), the component returns an indication of success, else the component returns an indication of failure.

The following paragraphs describe various embodiments of aspects of the CAI security system. An implementation of the CAI security system may employ any combination of the embodiments. The processing described below may be performed by a computing device with a processor that executes computer-executable instructions stored on a computer-readable storage medium that implements the CAI security system.

In some embodiments, a method performed by a computing system for authenticating a user is provided. When a time since a last authentication was successful is less than a recycle telephone number period, the method performs a primary authentication of the user based on a telephone number received from the user, and when the primary authentication is successful, indicates that the user has been authenticated. When the time since the last authentication was successful is not less than the recycle telephone number period, the method performs a secondary authentication of the user, and when the secondary authentication is successful, indicates that the user has been authenticated. In some embodiments, the performing of the primary authentication receives the telephone number from the user, sends an authentication code addressed to the telephone number, receives from the user an authentication code, and when the received authentication code matches the sent authentication code, indicates that the primary authentication is successful. In some embodiments, the secondary authentication is an active authentication. In some embodiments, the performing of the secondary authentication includes presenting a challenge to the user, receiving a response from the user, and determining whether the response is correct. In some embodiments, the secondary authentication is a passive authentication. In some embodiments, the user uses a user device that communicates with the computing system and the secondary authentication collects information relating to the user device and determines whether the collected information is consistent with information previously collected from a user device that communicated with the computing system when the user accessed an account with the telephone number as the account identifier. In some embodiments, the collected information includes different categories of information, a score is generated for each category, the scores are combined into a combined score, and when the combined score satisfies an authentication threshold, indicating that the secondary authentication is successful. In some embodiments, when the primary authentication is not successful, the method performs a secondary authentication. In some embodiments, the secondary authentication is performed after a primary authentication that was not successful, allowing the user to change the telephone number that is the account identifier. In some embodiments, the recycle telephone number period varies based on local assignors of telephone numbers.

In some embodiments, a computing system for authenticating a user is provided. The computing system comprises a computer-readable storage medium storing computer-executable instructions and a processor that executes the computer-executable instructions stored in the computer-readable storage medium. When the recycle account identifier criterion is satisfied, the instructions perform a secondary authentication. When a recycle account identifier criterion is not satisfied, the instructions perform a primary authentication. The instructions indicate that the user has been authenticated when an authentication that is performed is successful. In some embodiments, the account identifier is an electronic mail address. In some embodiments, the account identifier is a telephone number. In some embodiments, the primary authentication is a communications account identifier authentication. In some embodiments, the secondary authentication is an active authentication. In some embodiments, the secondary authentication is a passive authentication. In some embodiments, the instructions that perform the secondary authentication perform a passive authentication, and when the passive authentication is not successful, perform an active authentication.

In some embodiments, a method performed by a device of a user for authenticating the user is provided. The method sends to an authentication system a telephone number assigned to a telephone of the user. The method receives from the user an authentication code, the authentication code having been sent from the authentication system to the telephone. The method sends to the authentication system the authentication code so that the authentication system can determine whether a primary authentication is successful. When a recycled telephone number criterion is satisfied, the method receives from the authentication system a challenge, presents to the user the received challenge, receives from the user a response to the challenge, and sends to the authentication system the response so that the authentication system can determine whether a secondary authentication is successful. In some embodiments, the authentication code is sent to the telephone as a Short Message Service ("SMS") message. In some embodiments, the recycled telephone number criterion is based on whether a last authentication of the user occurred longer ago than a recycle telephone number period.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system for authenticating a user, the method comprising:
   receiving a telephone number for authenticating the user to access an account of the user;
   when a time since a last authentication was successful is less than a recycle telephone number period, where the recycle telephone number period is based on a recycle account identifier criterion a minimum time before which the telephone number will be assigned to a new user,
   performing a primary authentication of the user based on the received telephone number received from the user, where the telephone number is an account identifier associated with the account of the user;
   when the primary authentication is successful, indicating that the user has been authenticated;
   when the time since the last authentication was successful is not less than the recycle telephone number period, performing a secondary authentication of the user; and
   when the secondary authentication is successful, indicating that the user has been authenticated and allowing the user the option to change their account identifier.

2. The method of claim 1 wherein the performing of the primary authentication includes:
   receiving the telephone number from the user;
   sending an authentication code addressed to the telephone number;
   receiving from the user an authentication code; and
   when the received authentication code matches the sent authentication code, indicating that the primary authentication is successful.

3. The method of claim 1 wherein the secondary authentication is an active authentication.

4. The method of claim 3 wherein the performing of the secondary authentication includes presenting a challenge to the user, receiving a response from the user, and determining whether the response is correct.

5. The method of claim 1 wherein the secondary authentication is a passive authentication.

6. The method of claim 5 wherein the user uses a user device that communicates with the computing system and the secondary authentication collects information relating to the user device and determines whether the collected information is consistent with information previously collected from a user device that communicated with the computing system when the user accessed an account with the telephone number as the account identifier.

7. The method of claim 6 wherein the collected information includes different categories of information, a score is generated for each category, the scores are combined into a combined score, and when the combined score satisfies an authentication threshold, indicating that the secondary authentication is successful.

8. The method of claim 1 further comprising, when the primary authentication is not successful, performing the secondary authentication.

9. The method of claim 8 wherein the secondary authentication is performed after a primary authentication that was not successful, allowing the user to change the telephone number that is the account identifier.

10. The method of claim 1 wherein the recycle telephone number period varies based on local assignors of telephone numbers.

11. A computing system for authenticating a user, the computing system comprising:
    a computer-readable storage medium storing computer-executable instructions that:
       receive a telephone number for authenticating the user to access an account of the user;
       when a time since a last authentication was successful is not less than a recycle telephone number period for the telephone number, perform a secondary authentication and allow the user the option to change their account identifier, where the recycle telephone number period is a minimum time before which the telephone number will be assigned to a new user;
       when the time since the last authentication was successful is less than the recycle telephone number period a recycle account identifier criterion is not satisfied, perform a primary authentication; and
       indicate that the user has been authenticated when an authentication that is performed is successful, where at least one of the first authentication and the second authentication is based on an account identifier comprising the telephone number associated with an account of the user, the account relying on the account identifier to be established and accessed by the user within a recycle telephone period; and
    a processor that executes the computer-executable instructions stored in the computer-readable storage medium.

12. The computing system of claim 11 wherein the account identifier further comprises an electronic mail address.

13. The computing system of claim 11 wherein the primary authentication is a communications account identifier authentication.

14. The computing system of claim 11 wherein the secondary authentication is an active authentication.

15. The computing system of claim 11 wherein the secondary authentication is a passive authentication.

16. The computing system of claim 11 wherein instructions that perform the secondary authentication perform a passive authentication, and when the passive authentication is not successful, perform an active authentication.

17. A method performed by a device of a user for authenticating the user, the method comprising:

sending to an authentication system a telephone number assigned to a telephone of the user, where the telephone number is an account identifier associated with an account of the user, the account relying on the account identifier to be established and accessed within a recycle telephone period comprising a minimum time before which the telephone number will be assigned to a new user;

receiving from the user an authentication code, the authentication code having been sent from the authentication system to the telephone;

sending to the authentication system the authentication code so that the authentication system can determine whether a primary authentication is successful; and when a time since a last authentication was successful is not less than the recycle telephone number period for the telephone number, receiving from the authentication system a challenge;

presenting to the user the received challenge;

receiving from the user a response to the challenge; and sending to the authentication system the response so that the authentication system can determine whether a secondary authentication is successful.

18. The method of claim 17 wherein the authentication code is sent to the telephone as a Short Message Service ("SMS") message.

\* \* \* \* \*